Jan. 19, 1932.  A. J. PENOTE  1,842,193
SWINGING CONVEYER TRENCHER
Filed June 6, 1927   7 Sheets-Sheet 1

Inventor
Augustus J. Penote
By Frank D. Gray
Attorney

Jan. 19, 1932.  A. J. PENOTE  1,842,193
SWINGING CONVEYER TRENCHER
Filed June 6, 1927     7 Sheets-Sheet 2

Inventor
AUGUSTUS J. PENOTE
By Frank D. Gray
Attorney

Jan. 19, 1932.    A. J. PENOTE    1,842,193
SWINGING CONVEYER TRENCHER
Filed June 6, 1927    7 Sheets-Sheet 3

Inventor
AUGUSTUS J. PENOTE
By Frank D. Gray
Attorney

Jan. 19, 1932.  A. J. PENOTE  1,842,193
SWINGING CONVEYER TRENCHER
Filed June 6, 1927   7 Sheets-Sheet 4

Inventor
AUGUSTUS J. PENOTE
Frank D. Gray
Attorney

Jan. 19, 1932.  A. J. PENOTE  1,842,193
SWINGING CONVEYER TRENCHER
Filed June 6, 1927  7 Sheets-Sheet 6
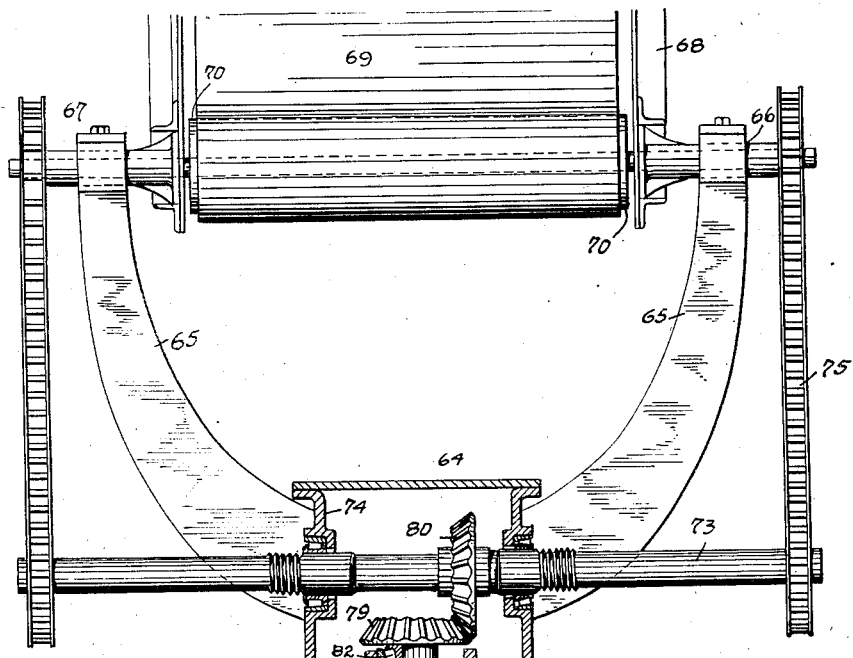
FIG. 6
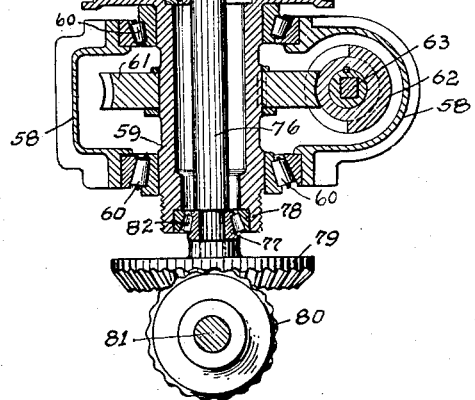
FIG. 7
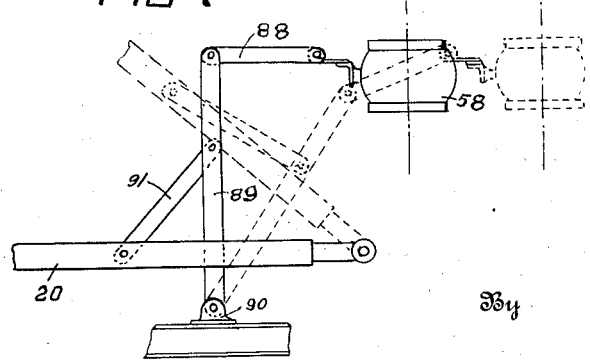
Inventor
AUGUSTUS J. PENOTE
By Frank D. Gray
Attorney Jan. 19, 1932.　　　A. J. PENOTE　　　1,842,193
SWINGING CONVEYER TRENCHER
Filed June 6, 1927　　　7 Sheets-Sheet 7
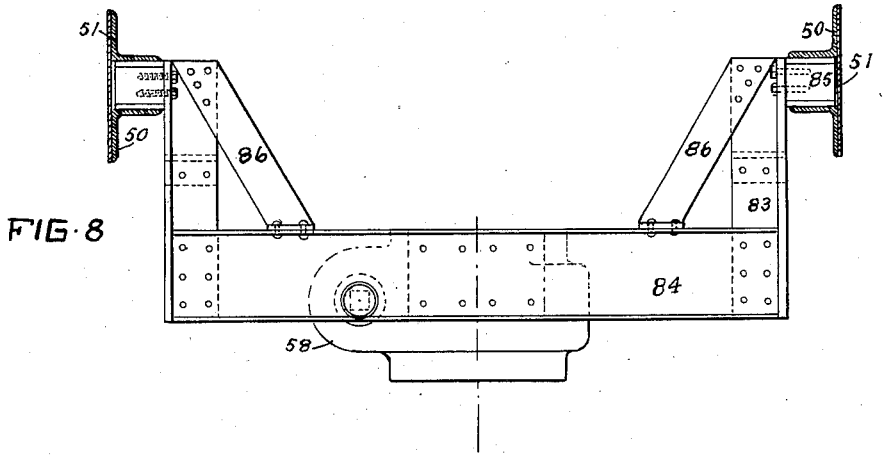
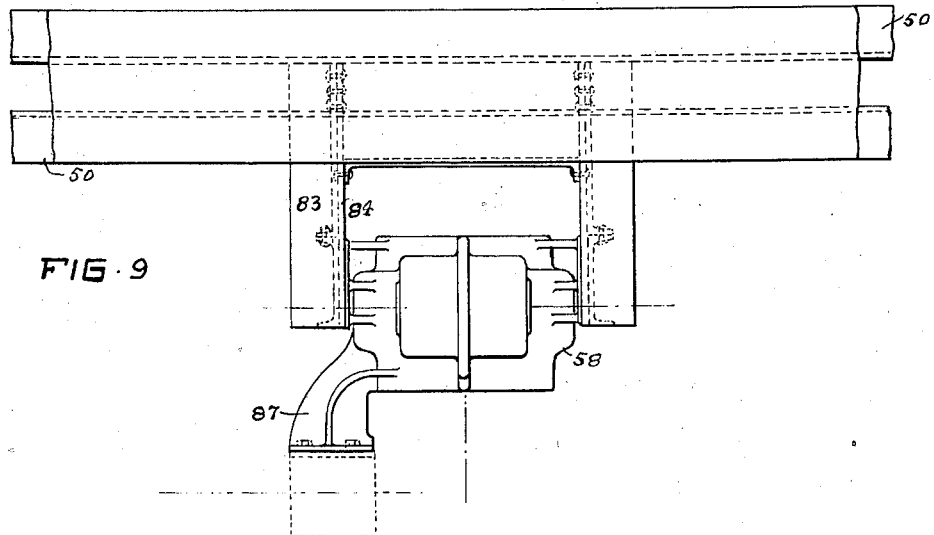
Inventor
AUGUSTUS J. PENOTE
By Frank D. Gray
Attorney Patented Jan. 19, 1932

1,842,193

UNITED STATES PATENT OFFICE

AUGUSTUS J. PENOTE, OF SHAKER HEIGHTS, OHIO

SWINGING CONVEYER TRENCHER

Application filed June 6, 1927. Serial No. 196,745.

This invention relates to swinging conveyer trenchers, and especially to such trenchers mounted upon tractor mechanism, preferably that of chain tractors, the power unit therefor having selective driving connection with the trench mechanism or the tractor mechanism, as desired.

It is a particular object of my invention to improve the type of excavating machines which include in their structure a conveyer mechanism mounted above the power mechanism for receiving thereon the excavated material from the excavating unit, so that the said conveyer is designed to deliver the material beyond the outline of the machine as a whole.

It is an object of my present invention to provide the excavating unit of such "reach" or extent that a very great depth of trench may be excavated, though the area of the tractor base be not appreciably enlarged. To accomplish this object, I disclose herein means for adjustment of the excavating unit in a direction longitudinal of the machine, as well as in a vertical plane, thus providing lowering of the excavating unit to the proper depth of the trench while the unit is being moved forward relative to the machine frame.

It is a further object of my invention to make possible the movement of the excavating unit forward of the machine as the said unit is raised from the trench, so that the weight of the unit shall be shifted more nearly directly above the center of the supporting chain tractors, when the unit is so raised.

It is a further object of my invention to provide a conveyer unit above the engine of the machine and beneath the upper end of the excavating unit so that the latter may deposit its material upon the conveyer. It is also my purpose to mount the said conveyer upon pivotal means permitting swinging the said conveyer in a horizontal plane, for the purpose of depositing the material therefrom in a wide range of area forward of and at either side of the machine, as may be most convenient.

It is a further object of my invention to mount the said conveyer of the endless type, upon a vertical pivot and utilize a vertical drive shaft for the conveyer belt, as the axis for swinging the conveyer unit as above explained. It is further explained as a feature of this invention, that a single source of power, here shown as an internal combustion engine, may by various connections, serve to either drive the conveyer belt, the chain excavator, the tractor mechanism, or to adjust the vertical position of the excavator unit or the lateral position of the conveyer unit.

A still further object of my invention is to so mount the conveyer beneath the delivery end of the excavator that the entire conveyer unit, including its intermediate driving means, may be shifted longitudinal of the machine without breaking the driving connection with the power source. This arrangement of the relative position of the conveyer unit makes possible the shifting of the conveyer forwardly as the excavator delivery end shifts in the same direction correspondingly. This is regarded as a very important feature of my invention.

With the above and other objects in view, my invention consists in the novel features of construction, combination and arrangement of parts to be hereinafter more fully described, recited in the appended claims and illustrated in the accompanying drawings, in which,—

Figure 6 is a detail transverse section on the line 6—6 of Fig. 1;

Figure 7 is a detail view of the connection members between the conveyer shifter and the boom link;

Figure 8 is a detail view, partly in transverse section, of the support mechanism for the conveyer, taken in the plane indicated by the line 8—8 of Fig. 1, and Figure 9 is a detail of the same in side elevation.

Figure 1:
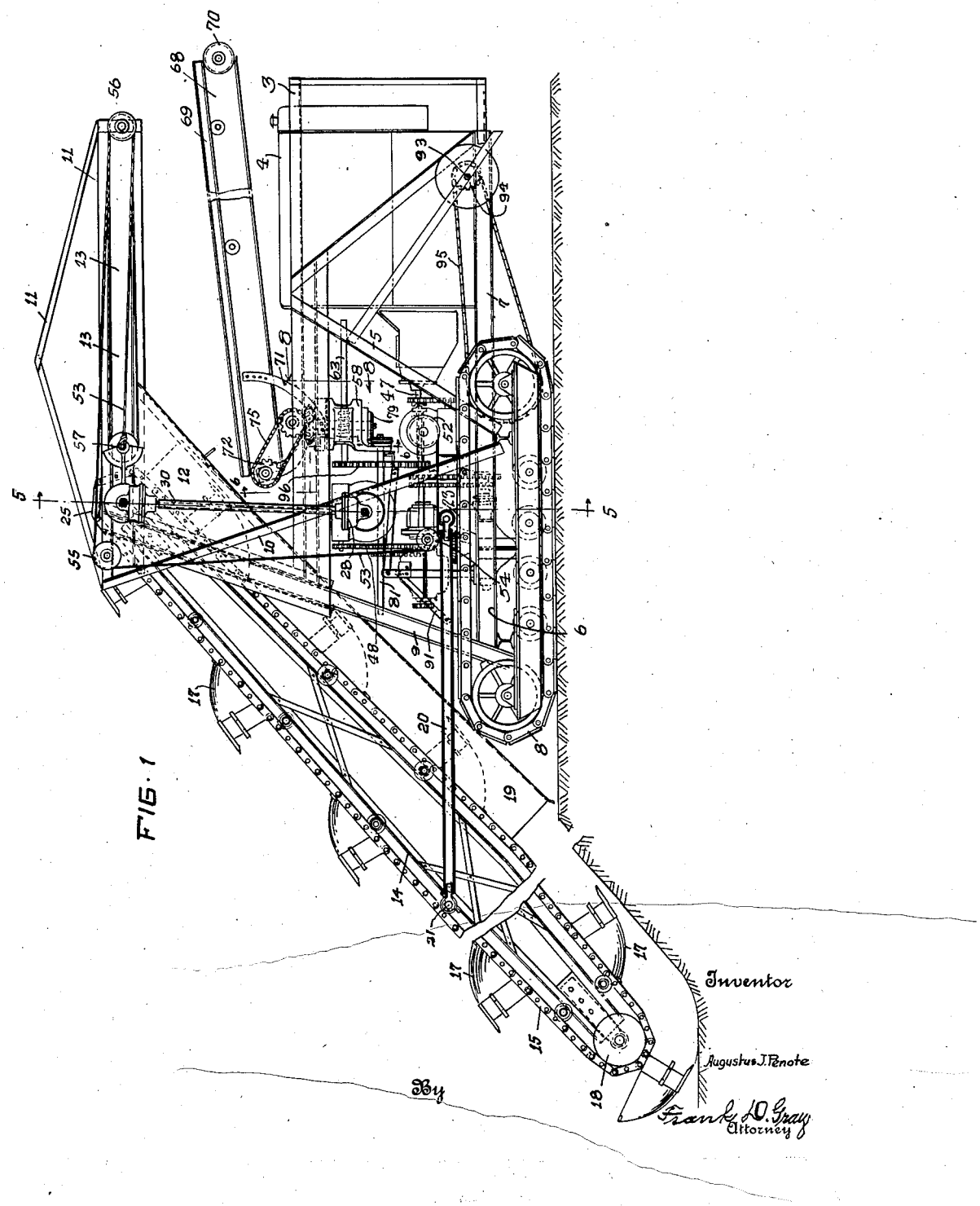
Figure 1 is a side view in elevation of my excavating machine shown in operative position.

Referring in detail to the drawings, 3 designates a vehicle frame comprising the usual base 6, including the sills 7, and driven by the single pair of endless traction belts 8. Upon this base is mounted a pair of inclined masts 9 at the rear of the machine, a pair of steel braces 10 resting upon the base and serving, together with the masts, to support overhanging, horizontal and forwardly-extending support members 11 in parallel relation, each member 11 being further supported and braced in its extending position by triangular plates 12, as shown clearly in Figs. 1 and 2. Each of these members 11 is slotted longitudinally as designated at 13 for a purpose to be later explained.

A rearwardly-extending digging boom 14 supports an endless chain digger unit 15, and is hinged upon the members 11 in pivotal arrangement, so that the lower end of the boom may swing outward, and upward to lift the digger from the trench. The unit 15 comprises parallel chains 16 carrying thereon a series of digging buckets 17 of more or less conventional character, the chains 16 being mounted upon and driven by sprockets 18 as illustrated. For a portion of the length of and beneath the boom, an elongated shield or guide 19 of trough shape in cross section, is attached to the boom for protecting the body of the machine and gearing from falling material which otherwise might drop from the moving buckets.

Somewhat forward of the center of the tractor base, a block 23 is mounted fixedly on the frame at either side of the machine, and a link 20 unsupported between its ends is pivoted rearwardly at one end to the boom 14 at a point 21 intermediate the ends of the boom, and at its other end to said block 23, at either side of the machine, whereby the distance between the blocks 23 and the pivot points 21, respectively, is always uniform. This relation just described, results that any movement of the pivotal points of the upper end of the boom forwardly will, because of the constant length of the unsupported links 20, raise the digging mechanism from the trench; and that the weight of the digger and boom will constantly tend to move such hinge points or pivots of the boom rearwardly. Further explanation of such conditions will be made in later description of other parts of the machine.

Figure 5:
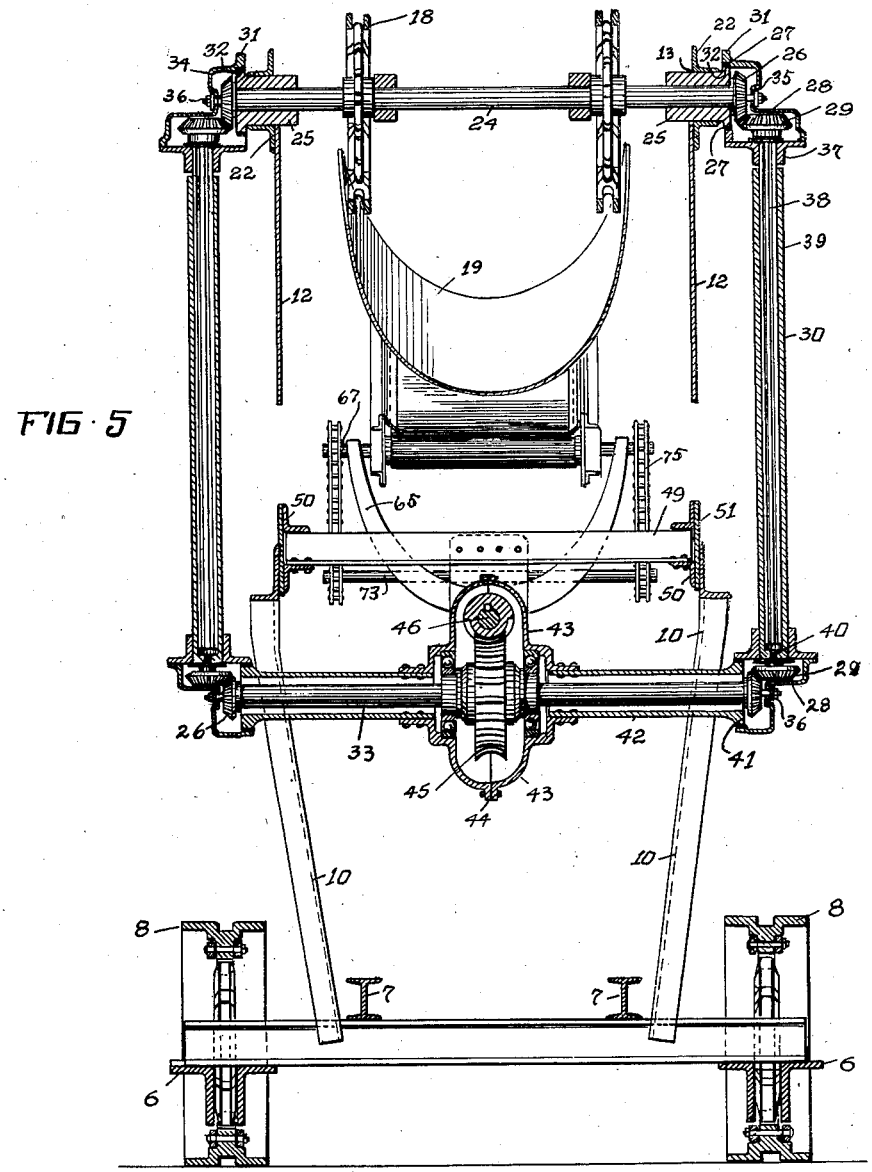
Figure 5 is a vertical sectional detail view in the plane indicated by the line 5—5 of Fig. 1.

The upper sprockets 18 for driving the digger chains 16 are mounted upon a transverse shaft 24, shown very clearly in Fig. 5 of the drawings. The ends of the shaft 24 are supported in blocks 25 which are movable in the slots 13, before referred to. In a horizontal plane, the block 25 is rectangular in form, it being elongated in the direction of the slot 13. Such support of the shaft 24 permits ready movement of the same together with the entire digger unit and its driving means, lengthwise of the members 11, and of the machine. The said slotted members 11 are each formed of spaced and parallel L bars 22 which are suitably braced and held in proper relation to provide therebetween the said slots 13 for guiding the blocks 25 in their movement for adjustment of the boom, such adjustment being designed to shift the boom and its heavy weight forwardly over the tractor unit when the digger mechanism carried by said boom is lifted from the trench.

Said shaft 24 therefore, serves several purposes quite different in character. It is provided with bevel gears 26 at its ends from which it is driven and thereby the chains 16; it serves as a pivot for the swinging of the boom thereon; and it reciprocates in the slots 13 as just explained. By such relation of parts, the shifting of the shaft 24 rearwardly in slots 13 results in the lowering of the digger mechanism into the trench and bodily movement of the boom and its parts rearward.

The shaft 24 is driven from a lower and parallel transverse shaft 33 through the medium of bevel gears 26 on both ends of each shaft, such gears being connected by corresponding bevel gears 29 on the ends of shafts 30 at either side of the machine. For the driving connection of these four shafts in the manner shown in Fig. 5 of the drawings, four casing heads are provided to protect the gears and to hold them in engagement. The outer sides of the blocks 25 are provided with vertically-extending flanges 27 upon which the upper casing heads 28 are mounted. These flanges 27, integral with blocks 25, are themselves circular and receive on their peripheries the inner facing rims 31 whose inner surfaces 32 are circular corresponding to the flanges 27, whereby the casings 28 with their suspended gearing therefrom are bourne at the outer ends of the shaft 24 and upon the flanges 27, while the weight of the boom and the chain digger is carried by the shaft 24 intermediate its ends, as shown in Fig. 5.

By the mounting of the casings 28 upon the flanges 27 through the intermediacy of circular agencies—27 and 32, the casings 28 may be permitted to rock in a vertical plane upon the shaft 24 as an axis. This is necessary by reason of the shifting of the shafts 30 in inclination and length, as the shaft 24 is moved forward or backward on the members 11 while the shaft 33 remains in one position, without the driving connection between shafts 33 and 24 being interrupted, whatever the position of the shaft 24 may be. This latter relative arrangement of the gearing is rendered essential for accommodation to the traveling movement of the boom and digging mechanism over the central portion of the machine.

The portion 34 of the casing 28 immediately about the shaft 24 has an aperture 35 therein through which the end of the shaft protrudes and receives thereon a nut 36 preventing disengagement of the gears, and of the casings from the blocks 25. In said aperture 35 are suitable bearings for permitting rotation of the shaft 24 therein. Within the lower portion of the casings 28 are located the bevels 29 carried by the vertical shafts 30. The casings 28 are provided with a hollow extension 37 relatively fixed thereon, and protecting the shaft 30 therewithin, there being bearings between the shaft and the extension 37 to permit rotation of shaft 30 freely.

The shafts 30 are sectional and telescopic, each such shaft being composed of an inner section 38 sliding into and out of the hollow section 39, but not relatively rotatable, such result being made positive by their construction in polygonal cross sectional form, or by keying together, as may be most feasible. The upper section 38 may be provided with a threaded opening in its end to engage the shaft part 40 adjacent the casing 28. The lower section 39 may be similarly connected to a casing head 28 about the ends of the shaft 33. In the lower casings 28, the inner faces of the same engage the peripheral flanges 41 of the casing 42 which protects the shaft 33, as shown in Fig. 5. From this description, it will be seen that the entire shaft 30 may rotate bodily together with its bevel gears 29 without interrupting movement of the boom lengthwise of the machine. The shafts 30 are shown in their closed relation in Figs. 1, 3 and 5; while they are shown in their extended relation in Fig. 2 where the boom is raised and shifted forwardly.

The ends of the shaft 33 are extended out beyond the casing 28 and secured by nuts as in the other casings 28. The casing 42 must be provided with an enlargement intermediate its ends to enclose worm gearing therein, and to do this, the casing 42 may be divided into two tubes, two cup members of enlarged size 43 being riveted to the casing sections and to each other at 44. Within this intermediate casing 43 a worm gear 45 is mounted on the shaft 33 for rotation therewith, and a worm shaft 46 enters the casing and engages the gear 45 for driving the latter and thereby the excavating chains. The shaft 46 is driven from the main power shaft 47 by suitable gear connection 48. The casing 43 is suspended from a cross bar or plate 49 whose ends are secured to intermediate portions of the inclined braces 10 by means of suitable arrangement of Ls 50 connected in spaced relation by a plate 51 secured to each. The shaft 33 is therefore mounted for rotation upon the brace members of the frame. By drive of the power shaft 47 therefore, the digger chains 16 may be continuously driven, whatever the position of the boom may be.

Gravity tends to draw the upper end of the boom 14 rearwardly (the engine being considered mounted on the forward end of the machine). For adjusting the boom, as for raising the excavator out of the trench, I have provided a series of pulleys with suitable strands and power reels for taking up the strand. As shown in Fig. 1 of the drawings, I mount a reel 52 on either side of the machine on a fixed portion of the machine frame, and conveniently near the engine shaft 47 for gearing connection therewith. Chains or cables 53 fixed to such reels 52 lead therefrom over pulleys 54 up over guide pulleys 55, thence forward to guide pulleys 56 at the forward end of the extensions 11, and over said pulleys back to pulleys 57 carried by the moving blocks 25, forward again to pulleys 56 and thence back to the blocks 25 to which the ends of the chains or the cables 53 are fixedly attached. Winding the cables 53 about the reels 52 will therefore, move the blocks 25, and consequently the shaft 24 with the upper end of the boom 14, forwardly, and thereby raise the digger mechanism from the trench, because the links 20 resist buckling action thereof.

A very important feature of my excavating machine is the provision of conveyer just underneath the upper end of the excavating or digger unit, and so mounted that it may be swung about a vertical axis by power means, to deliver the material where it is convenient to receive it outside the outline of the machine and at different positions in an arc extending over 180 degrees or somewhat more, depending upon the character of the surface of the ground where the conveyer may deposit such material. Such mounting of the conveyer comprises actuating means for the movement of the conveyer unit about its vertical axis and, further, power-driven means for actuating the conveyer belt itself, and such mounting will now be described.

Within a fixed casing 58, suitable to enclose a cylindrical hollow casing 59, I enclose driving worm gearing, and shown in vertical section in Fig. 6. The said vertical casing 59 may rotate upon suitable bearings 60, and has mounted thereon for its actuation a worm gear 61 engaged by the driving worm 62 mounted on the horizontal drive shaft 63 which protrudes through the casing 58 and is slidably non-rotatably engaged with the worm 62 by polygonal form of the shaft in cross section or by keying, to prevent relative rotation of the shaft and worm. Integral with the casing 59 is an upper enlarged hollow gear casing 64, preferably rectangular in outline in cross section but somewhat elongated in a direction lengthwise of the belt 69.

Mounted on said casing 64 and rising therefrom in an upward and rearward direction are provided frame arms 65 whose upper ends are widely spaced and have bearings thereon 66 for receiving therein a horizontal drive shaft 67 upon the intermediate portion of which between the arms 65 is pivoted the spaced conveyer frame members 68 which are rigidly braced in their separated relation for supporting the conveyer belt 69 thereon and driving rolls 70, one of which is mounted on the shaft 67 and the other in bearings at the outer end of the frame members 68, the endless conveyer belt 69 being mounted conventionally on said rolls.

Forward of the arms 65 a pair of spaced brace members 71 are pivoted to the casing 64 in suitable manner with the upper ends thereof positioned just outside of the frame 68 on either side thereof, and adapted to engage, interchangeably, a bolt or pin on the members 68 to adjust the desired height of the conveyer on its pivot 67. Suitable means may be provided for locking the brace members in their adjusted inclination. The belt element 69 is driven from the roll 70 carried on the shaft 67, the latter having on its ends outside the arms 65, suitable sprockets 72. A driving shaft 73 passes through the casing 64 parallel to shaft 67 and mounted upon the side walls 74 of casing 64 in bearings therein. Sprockets 72 similar to those on shaft 67 are mounted in alinement with their corresponding gears and sprocket chains 75 at either side engage the respective sprockets.

By the structure above described, the rotation of shaft 63 may drive the casings 59 and 64 together with their supported conveyer structure, about the axis of casing 59, while the conveyer belt 69 may be actuated from shaft 73 while the conveyer is in any position upon said axis. For driving the shaft 73, a vertical shaft 76 is mounted within and longitudinally of the casing 59, being provided with sleeve members 77 engaging the ends 78 interiorly of the casing 59, to make proper rotation therein. Both ends of the shaft 76 are provided with bevel gears 79, the upper one of which engages a bevel gear 80 secured to the shaft 73 within the casing 64. A similar bevel gear 80 is mounted upon a horizontal shaft 81, for engaging gear 79 below the casing 59, so that rotation of shaft 81 will drive the conveyer belt 69.

The sleeves 77 of the shaft 76 rotate upon suitable bearings 82 upon the ends of the casing 59, so that the parts 59 and 76 are independently rotatable, the latter driving the conveyer belt, while the former adjusts the conveyer in its relative position about the axis of the shaft 76. The shaft 63 is elongated for quite an extent and is slidably movable through the worm 62 whereby the shaft is immovable lengthwise of the frame, but rotatable to drive the worm, while the entire conveyer mechanism with its gearing and casings 58, 59 and 64, are movable longitudinally of the machine as the worm 62 slides along the fixed shaft 63, these arrangements of relative parts serving an important function to be described now in further detail. It should be noted, however, that the shaft 81 is carried lengthwise of the frame together with the bevel gear 80, another portion of the shaft 81 sliding through an element for driving the same rotatably.

While the casing 58 has been referred to as "fixed", in describing the parts mounted within the same, such term is intended to be used in the sense of being fixed relative to the rotating parts within. Because of the arrangement of the boom and its chain digger mechanism thereon for movement longitudinal of the machine, it has been found necessary that the casing 58 together with all parts carried thereby, shall be mounted for corresponding longitudinal movement in parallelism with the direction of movement in which the boom travels, to insure vertical alinement of the upper end of the chain digger mechanism for depositing the excavated material, and the approximate point above the axis of the parts 59 and 76. The structure for causing such movement of the conveyer mechanism bodily forward will now be described.

Mounted forward of the braces 10 and the casings 58, 59 and 64, are frame braces 5 upon which the forward ends of the L's 50 and plates 51 are mounted, the rear ends of such L's and plates being mounted securely upon the long braces 10, in the manner indicated in Fig. 5 of the drawings. Between the rearward position of the plate or bar 49 which carries the casing 43 and drive gearing for the shafts 30, and the forward braces 5, the casing 58 is mounted upon said L's 50 and plates 51 for reciprocating movement thereon longitudinally of the machine. The casing 58 is carried by vertical bars 83 which may be L-bars connected together by flat plates 84 bolted or riveted thereto, the casing 58 being directly mounted between said plates 84 which are suitably spaced to receive it, as shown in Fig. 9.

To the upper ends of the bars 83 are secured outwardly-directed blocks or plates 85 of proper size and proportions to fit the space between the L's 50 whereby the casing 58 and its mounting may readily travel lengthwise of the machine. Suitable inclined braces 86 connect the bars 83 and the plates 84 for the purpose of great rigidity. The casing 58 is provided at its lower portion with a downwardly-extending arm 87 perforated to receive therein the shaft 81, as shown in Fig. 1. To said arm 87 there is fixed a link 88 extending rearwardly and connected with actuating means for reciprocating the conveyer in the track just described.

When the digger mechanism 15 is in its lower or operative position in the trench, the link 20 is substantially in horizontal position, as shown in Fig. 1. This position is further shown in Fig. 7. The link 88 is then substantially parallel with link 20. A lever bar 89 is pivoted to a part 90 of the base, and the upper end of bar 89 is then pivoted to the rear end of the actuating link 88, so that swinging the lever bar 89 on its pivot will reciprocate the casing 58 along the parts 50 and 51, and as a result, when the digger mechanism 15 moves toward or from the trench being dug, the long link 20 will move on its pivot 23, and the casings 58—59—64, together with the conveyer supported thereby, will be moved bodily lengthwise of the machine to cause the position of the conveyer to remain beneath the delivery end of the endless chain digger.

It is to be noted that the parts 20 and 89 are not connected directly together, though the former operates the latter. Instead, an inclined link or pivoted brace 91 connects the two, so that the fulcrum of the bar 89 may remain constant in position, while the digger boom is swinging the bar 89 and thence the casing 58. The movement of the latter, which carries with it the conveyer itself as well as its actuating mechanism, is guided positively by the travel of the blocks 85 in the tracks resulting from the L's 50 and plates 51. This travel is in the longitudinal direction of the machine, and serves to attain the above-named result as to the relative position of the conveyer and the digger mechanism. This is a great advantage since it permits the bodily movement of the shaft 24 in the slot 13 and yet maintains a substantial position of the said shaft directly over the conveyer belt. Such relative position of the parts not varying materially while the digger chains reach down to or beneath the surface of the ground.

The movement of the two elements—the boom and the delivery conveyer 69, in unison longitudinally of the machine frame, makes feasible the swinging of the conveyer 69 about the vertical shaft 76 to deliver the material either forward of the machine or at either side thereof, the adjustment of the conveyer on the tracks at 85 as the digger mechanism rises, insuring the dropping of the material upon the substantially identical spot on the conveyer apron 69.

Figure 2:
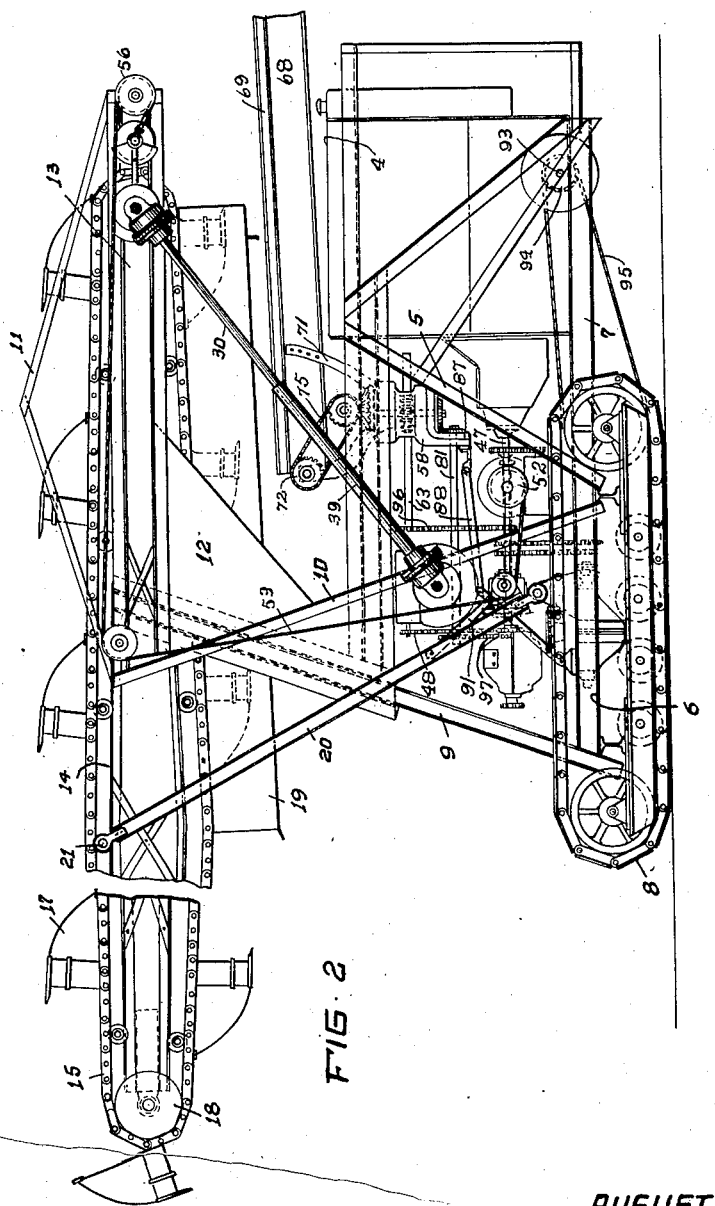
Figure 2 is a similar view of the machine in an inoperative position of the boom.
Figure 3:
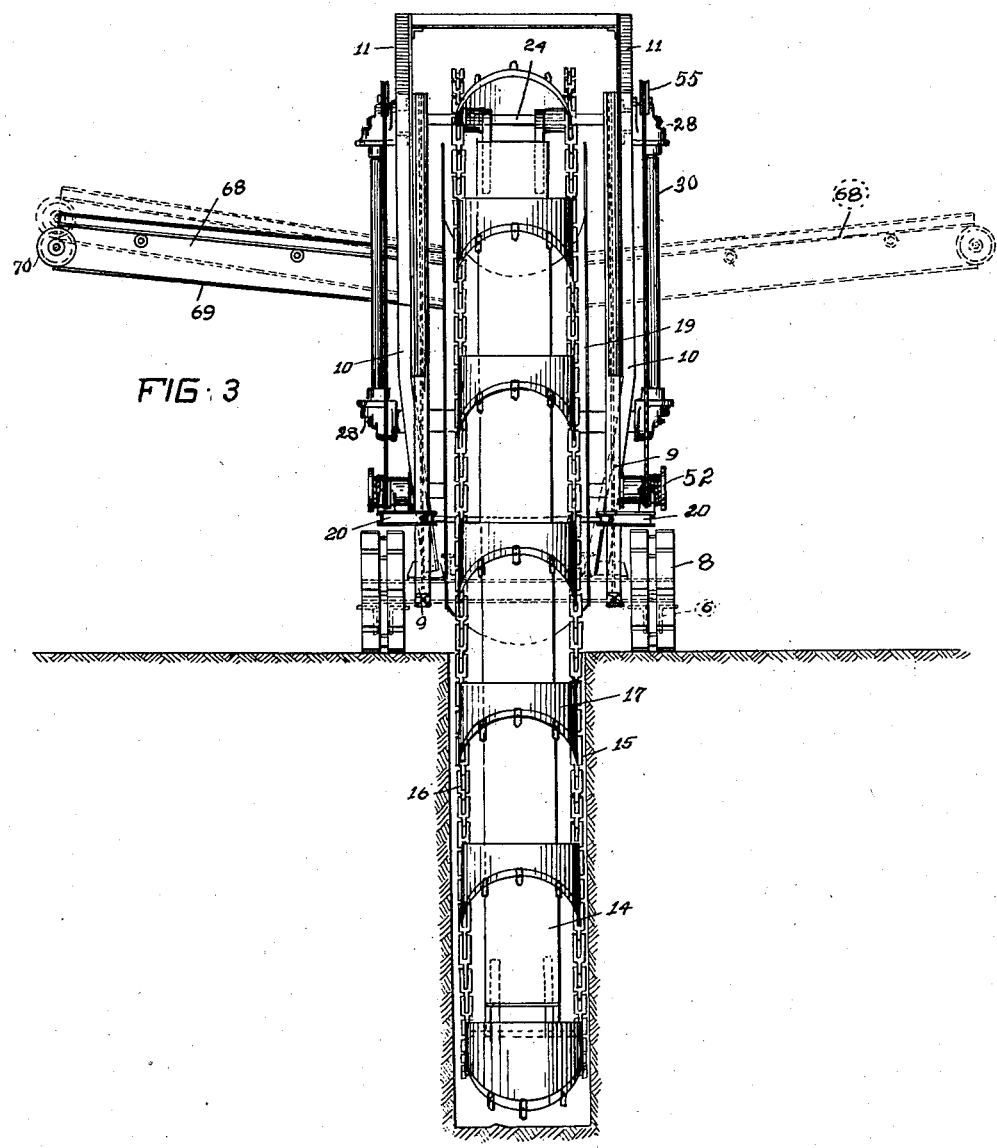
Figure 3 is a rear elevation of the machine with the excavating unit in operative position.
Figure 4:
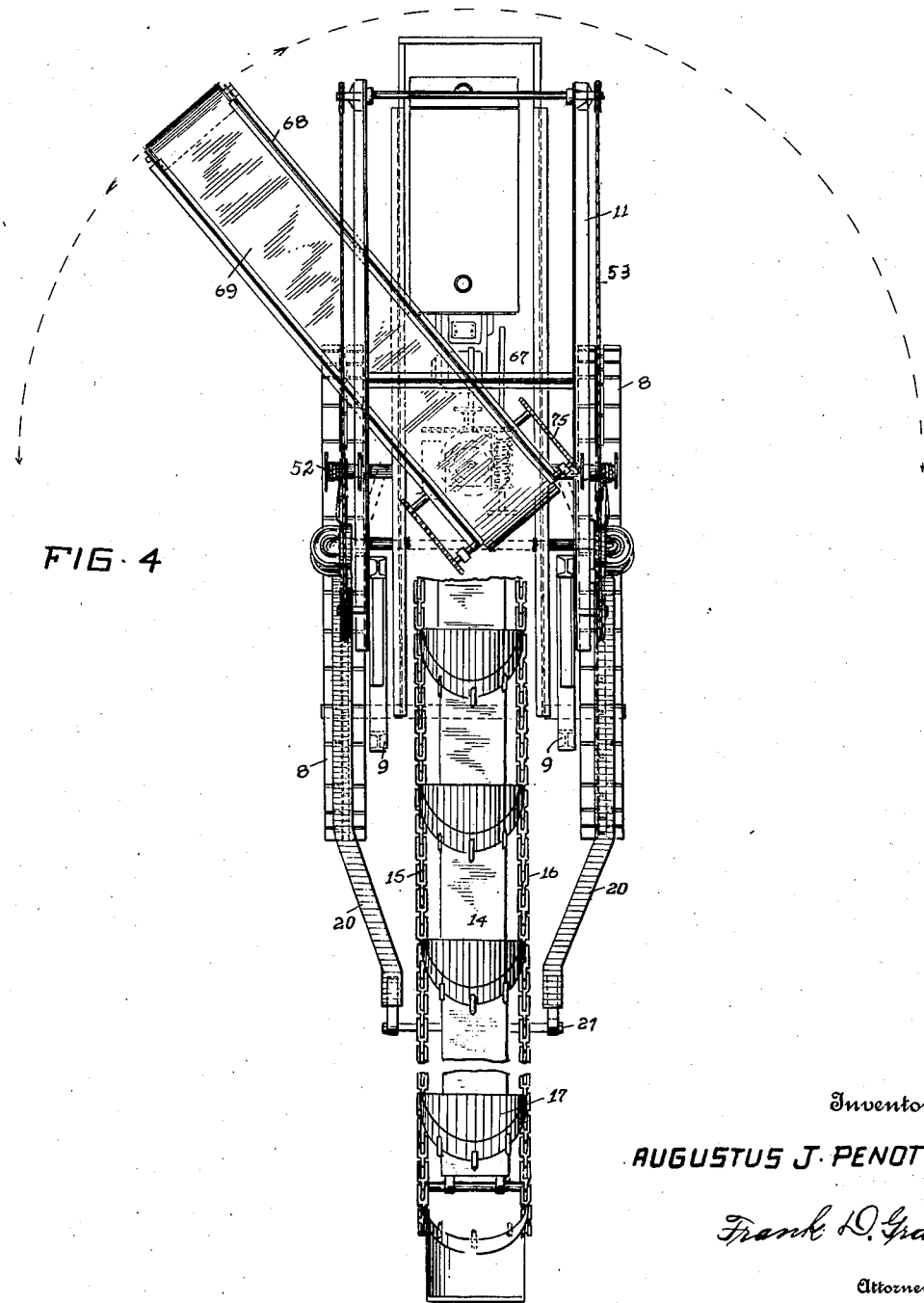
Figure 4 is a plan view of the machine with portions broken away.

Detailed description of the driving mechanism for the various elements of the machine will now be set forth. The shaft 47 has already been referred to as the main power shaft. It is longitudinal of the machine and extends rearwardly from the engine 4 and has various driving connections with the several elements of the machine. It has suitable gear connection 48 with the worm shaft 46, sprocket drive connection 96 with the worm shaft 63 and other drive connection 97 with the shaft 81 positively keyed to the bevel gear 80. Shaft 47 drives the belts 8 by worm and gear which drive cross shafts 93 having sprockets 94 at their ends, each driving a chain 95, as shown in Figs. 1 and 2. Not all the details of the selective drive mechanism for furnishing power for the several parts of the machine are illustrated in associated relation, since these features follow more or less, the structure disclosed in my former Patent No. 1,553,833 issued Sept. 15, 1925, whose transmission gearing is substantially like that of the present disclosure. Such reference is made because no claim is made herein to such driving features.

In the present case, I have incorporated the steering feature by application directly to the driving belts of the machine, from the disclosure made in the above-mentioned patent, whereby the tractor belt on each side is driven through a differential gear system of well-known character, so that tightening certain brake bands, selectively applied to pulleys on shafts 93, at the proper side of the machine will serve to guide or steer the machine toward the side whose bands are actuated with greatest force. Further details of this steering mechanism will be found in the cited patent. Somewhat conventional driving connections are provided between the power shaft 47 and the several units of the machine which provide different speeds for the actuation of the digging mechanism, and for the propulsion of the machine, as well as selective control of such driving connections. Suitable clutches for making such connections are provided and also conveniently positioned control levers for operating such clutch connections. These have not been shown in detail in this disclosure, reference being made to the particular patent cited herein for more elaborate explanation of such details.

Operation: In inoperative position, with parts at rest, the boom may assume the horizontal position illustrated in Fig. 2 of the drawings. The digging chains 16 may be driven from the engine shaft 47 while the boom is in this position which is a very evenly-balanced position, for the reason that the shaft 24 together with its bearing blocks 25 has reached the extreme forward position in the slots 13 of the members 11, whereby the upper end of the boom now overhangs the forward ends of the endless tractor base about as far as the rear end of the boom overhangs the rear end of the base. This is a very practical position for transportation over highways for a limited distance.

Permitting unreeling of the cable 53 from reels 52 permit the weight of the rear end of the boom to exert force downwardly from the position shown in Fig. 2, while the links 20 compel the pivots 21 to remain at a constant distance from the base pivots 23 and therefore pull the cross shaft 24 rearward in the slots 13, the telescopic shaft 30 permitting constant actuation of the shaft 24 and the chains 16 at either limit of such adjustment or while the shift is being made.

The conveyer 69 has two power-actuated movements—driving of the shaft 63 from the engine shaft 47 through the intermediacy of the sprocket chain 96 whereby the entire conveyer unit is swung about the axis of the vertical shaft 76 to deliver material from the conveyer beyond the outline of the machine on either side of or in front of the said shaft 76, and driving of the apron rolls 70 through the actuation of the chains 75, bevel gears 79 and 80, shaft 76 and the horizontal shaft 81 which receives its power from the engine shaft 47 by the driving connection 97. This latter actuation of the conveyer apron 69 may be attained when the conveyer unit is adjusted to anyone of its relative positions about the axis of shaft 76.

The connection of the boom 14 with the conveyer unit 69 by the link system shown in Fig. 7 of the drawings, makes the mutual movement of the two elements very positive and certain, so that the point upon the apron 69 directly above the shaft 76 will remain substantially beneath the upper end of the digger unit 15 during the position of the lower end of the unit 15 in the trench. Some time after the said lower end of the unit 15 has moved out of the trench, a point will be reached where the shaft 24 has moved forward in the machine faster than the vertical shaft 76 of the conveyer mechanism has been advanced by its connection with the link 20, but it is now immaterial what the relative position of the two units 15 and 69 are, since the unit 15 is no longer carrying material from the trench, and hence is not delivering anything at points beneath the shaft 24. When however, the reels 52 are unwound and as a result, the unit 15 gradually sinks down toward the trench, the shaft 24 moves rearwardly until it finally assumes its normal position above the shaft 76 of the conveyer, and the latter is positioned to receive the material directly from the upper end of the chain digger unit 15. Thus the two units 15 and 69 are actuated together from a common source of power, but they are adjusted together in proper relative position while it is essential that they should be.

I have made use of different means for changing the speed of the tractor belts, as I have explained in said Patent Number 1,553,833, and have not found it desirable to repeat such details in this description. Desirable lever members and connections are intended to be used in this machine as found expedient, such mechanical elements for manual control of the machine being understood and assumed, though not claimed in this application.

Having now fully described my invention, what I claim as new and desire to secure by Letters Patent is:

1. An excavator for making trenches comprising a supporting frame, a digger mechanism pivoted in said frame to permit raising the mechanism from and lowering it into the trench, means for driving said digger mechanism, means for adjusting the digger mechanism longitudinally of the excavator, and conveyer mechanism mounted upon a vertical pivot of the frame beneath the digger mechanism above the surface of the ground to receive from the digger mechanism material raised from the trench, means for adjusting the vertical pivot lengthwise of the excavator, and power means for swinging said conveyer mechanism about said vertical pivot.

2. An excavator for making trenches comprising a vehicular supporting frame, an endless digger mechanism, a boom supporting said mechanism and pivoted upon said frame for swinging movement in a vertical plane, means for driving said mechanism, means in said frame for moving the boom bodily forward at the same time swinging the same on its pivot, conveyer mechanism mounted upon a vertical pivot on said frame beneath the upper end of said digger mechanism to receive excavated material therefrom, power means for actuating said conveyer mechanism to adjust the same about said vertical pivot, and power means for shifting said conveyer mechanism bodily lengthwise of the excavator to maintain said vertical pivot approximately underneath the delivery end of the digger mechanism.

3. An excavator for making trenches comprising a vehicular supporting frame, an endless digger mechanism, a boom for supporting said mechanism thereon and pivoted upon said frame, means for driving said mechanism, means for moving said boom bodily forward in said frame lengthwise of the latter, conveyer mechanism mounted upon a vertical pivot in said frame and beneath the upper end of said boom to receive excavated material from said digger mechanism, power means for actuating said conveyer to deposit the material received from the digger mechanism beyond the outline of the main frame forward of or on either side of the latter, said power means operating through the axis of said vertical pivot, means power-driven, for bodily moving said conveyer mechanism lengthwise of the main frame to maintain the receiving point of the conveyer substantially directly underneath the upper end of said digger mechanism, the movements of the boom and conveyer forward of the frame being in substantially parallel directions.

4. A machine for making trenches comprising a vehicular supporting frame, an endless digger mechanism, means for actuating said mechanism, means for propelling the machine forward during the operation of said mechanism, a horizontal shaft mounted transverse of said supporting frame, a boom pivoted upon said shaft and supporting said digger mechanism, means in said frame for guiding said shaft in reciprocating movement longitudinally of the machine, and an endless conveyer mounted upon a vertical pivot of the machine beneath the upper end of the digger mechanism, and for swinging movement about said pivot for receiving material from the digger and depositing it at points beyond the outline of the machine forward of or at either side of the same.

5. An excavator for making trenches comprising a supporting frame including parallel, spaced longitudinal extensions positioned above the base of said frame, an endless chain digger, a boom carrying said digger thereon, a transverse shaft mounted upon the said spaced extensions, the upper end of the boom being pivoted on said shaft for swinging in a vertical plane down into the trench and rising upward therefrom, means pivoted to said lower portion of said frame for maintaining the boom spaced from said portion, said extensions from the frame having guiding means for the movement of said shaft lengthwise thereof, and means for actuating said shaft in its movements in said guiding means.

6. An excavator for making trenches comprising an elongated supporting frame for movement over the ground surface, an endless chain digger mechanism, a boom supporting said mechanism, a drive shaft for actuating said mechanism, mounted transversely of said frame, for reciprocation lengthwise thereof and on which the said boom is pivoted, a rigid link pivoted at one end at a fixed point on the frame and at the other end at a point intermediate the ends of the boom for maintaining a uniform distance between said points, and means for advancing the said drive shaft in a substantially horizontal plane along the machine frame toward its forward end.

7. An excavator for making trenches comprising a supporting frame for movement over the ground surface, an endless chain digger mechanism, said supporting frame including parallel, rigid arms extending in spaced relation forwardly over the main body of the excavator, each of said arms being provided with a guide slot longitudinal thereof, a transverse shaft pivoted in said arms with its ends extending in the respective slots, a boom pivoted on said shaft between said arms and supporting said digger mechanism, and means for advancing said shaft from the rear to the forward ends of said slots and thereby raising said digger mechanism from the trench.

8. An excavator for making trenches comprising a supporting frame for movement over the ground surface, an endless chain digger mechanism, a boom for supporting said digger mechanism, said supporting frame including parallel rigid arms extending in spaced relation forwardly from the rear portion of the machine, each arm having a longitudinal slot therein, a shaft supported transversely of the machine with its ends protruding outward through one of said slots and the said boom having its upper end pivoted upon said shaft between said arms, driving means on said shaft between said arms for actuating said digger mechanism, a power shaft mounted longitudinally of the frame, driving connections between said power shaft and the outer ends of said transverse shaft, link means for preventing swinging of the lower end of the boom too closely approaching the excavator frame, block and tackle mechanism actuated by power-driven reels for advancing said transverse shaft forwardly in said slots without interrupting the driving connection between the power shaft and the transverse shaft, and thereby raise the digger mechanism from the trench.

9. A machine for making trenches comprising an endless digger mechanism, a vehicular frame for supporting said mechanism, motor drive means mounted on said frame, means for actuating said mechanism, a shaft mounted transversely of said frame, a boom supporting said digger mechanism and pivoted upon said shaft, conveyer mechanism mounted upon a vertical pivot of the frame beneath the digger mechanism and above the surface of the ground to receive from the digger mechanism material raised from the trench, cooperating means connecting the digger mechanism and the conveyer mechanism for maintaining the discharge end of the digger mechanism in substantially the same vertical position relative to the vertical pivot of the conveyer mechanism, though both mechanisms are moved longitudinally of the machine.

In witness whereof I have hereunto set my hand this 31st day of May, 1927.

AUGUSTUS J. PENOTE.